(12) United States Patent
Zhu et al.

(10) Patent No.: US 10,193,668 B2
(45) Date of Patent: Jan. 29, 2019

(54) ENODEB-BASED COMMUNICATION METHOD AND COMMUNICATION SYSTEM

(71) Applicant: Yulong Computer Telecommunication Scientific (Shenzhen) Co., Ltd., Shenzhen, Guangdong (CN)

(72) Inventors: Yajun Zhu, Guangdong (CN); Yiqing Cao, Guangdong (CN); Yunfei Zhang, Guangdong (CN)

(73) Assignee: Nanchang Coolpad Intelligent Technology Company Limited, Nanchang, Jiangxi (CN)

( * ) Notice: Subject to any disclaimer, the term of this patent is extended or adjusted under 35 U.S.C. 154(b) by 32 days.

(21) Appl. No.: 15/426,504

(22) Filed: Feb. 7, 2017

(65) Prior Publication Data
US 2017/0149541 A1    May 25, 2017

Related U.S. Application Data

(63) Continuation of application No. PCT/CN2014/096037, filed on Dec. 31, 2014.

(30) Foreign Application Priority Data

Aug. 7, 2014    (CN) .......................... 2014 1 0388106

(51) Int. Cl.
*H04L 5/00*    (2006.01)
*H04W 28/08*    (2009.01)
(Continued)

(52) U.S. Cl.
CPC .......... *H04L 5/0035* (2013.01); *H04L 5/0073* (2013.01); *H04W 28/08* (2013.01);
(Continued)

(58) Field of Classification Search
CPC .... H04L 5/0035; H04L 5/0073; H04W 28/08; H04W 36/00; H04W 72/0446; H04W 72/0453; H04W 72/048; H04W 72/085
See application file for complete search history.

(56) References Cited

U.S. PATENT DOCUMENTS 8,989,125 B1 *   3/2015  Marupaduga .......... H04B 7/024
                                                        370/329
2010/0267341 A1*  10/2010  Bergel ................. H04B 7/0617
                                                         455/63.1
(Continued)

FOREIGN PATENT DOCUMENTS

CN    101720096 A    6/2010
CN    101754346 A    6/2010
(Continued)

OTHER PUBLICATIONS

Extended European Search Report dated Feb. 22, 2018 in corresponding EP Application No. 14899342.1.

*Primary Examiner* — Ajay Cattungal
(74) *Attorney, Agent, or Firm* — Young Basile Hanlon & MacFarlane, P.C.

(57) ABSTRACT

An eNodeB-based communication method and communication system include dividing a plurality of eNodeBs into at least one eNodeB cluster; when a terminal is moving within any particular eNodeB cluster of the at least one eNodeB cluster, the terminal obtains identification information of the particular eNodeB cluster, and determines an eNodeB associated with the terminal from among the particular eNodeB cluster; and a specified eNodeB of the particular eNodeB cluster schedules the eNodeB associated with the terminal to provide communication services for the terminal.

20 Claims, 4 Drawing Sheets

(51) Int. Cl.
*H04W 36/00* (2009.01)
*H04W 72/04* (2009.01)
*H04W 72/08* (2009.01)

(52) U.S. Cl.
CPC ......... *H04W 36/00* (2013.01); *H04W 72/048* (2013.01); *H04W 72/0446* (2013.01); *H04W 72/0453* (2013.01); *H04W 72/085* (2013.01)

(56) References Cited

U.S. PATENT DOCUMENTS

| | | | |
|---|---|---|---|
| 2013/0028109 A1 | 1/2013 | Jöngren et al. | |
| 2013/0242812 A1* | 9/2013 | Khoryaev | H04W 72/0413 370/278 |
| 2014/0179325 A1 | 6/2014 | Xu et al. | |
| 2014/0269492 A1* | 9/2014 | Forenza | H04B 7/0452 370/328 |
| 2015/0092704 A1* | 4/2015 | Chen | H04W 72/1231 370/329 |
| 2015/0230160 A1* | 8/2015 | Lin | H04W 76/18 370/252 |

FOREIGN PATENT DOCUMENTS

| | | | |
|---|---|---|---|
| CN | 103228014 A | 7/2013 | |
| CN | 103906152 A | 7/2014 | |
| CN | 104125598 A | 10/2014 | |
| EP | 2424290 A1 | 2/2012 | |
| WO | WO2013172746 A | 11/2013 | |
| WO | WO2013191636 A | 12/2013 | |
| WO | WO 2013191636 A1 * | 12/2013 | ............. H04B 7/024 |

\* cited by examiner ial application no. PCT/CN2014/096037, filed on Dec. 31, 2014, which claims priority to Chinese Patent Application no. 201410388106.3, filed on Aug. 7, 2014, the disclosures of both of which are herein incorporated by reference in their entireties.

TECHNICAL FIELD

The present disclosure relates to the field of communication technology, and particularly to an eNodeB-based communication method and an eNodeB-based communication apparatus.

BACKGROUND

In the present wireless communication system, in order to further improve the capacity of the network, the miniaturization of eNodeBs and the densification of network nodes have become an inevitable choice. However, the densification of network nodes will inevitably bring about interference with each other, and strong interference between nodes will greatly affect the performance of the system.

In order to solve the problem of interference problem between low power nodes, 3GPP has done a lot of standardization work. In stage R10/11, for the scene in which a macro eNodeB and a low power eNodeB work at the same frequency, the ABS (Almost Blank Sub-frame) method is introduce, in which an interference source can configure an ABS on some sub-frames, and in the sub-frame where the interference source is configured with the ABS, the interfered node can schedule the user whose interference is more serious. In the current stage R12, taking into account a more intensive small cell deployment scenario, and a small cell on/off method is introduced, in which some small cells can be turned on or off according to changes in business or interference. In this way, the interference among small cells can be avoided, and here are certain benefits for eNodeB energy saving either.

In most of the existing interference avoidance methods, for example, the TDM (Time-Division Multiplexing) method, interference are avoided by coordinating resources and the effectiveness of resource use will be relatively low. In other methods, such as terminal side interference cancellation, it is necessary to implement a relatively complex interference cancellation algorithm on the terminal side, and this has a higher demand on the realization of the complexity of the terminal. For the method that avoid interference via CoMP (Coordinated Multiple Points), generally, the CoMP mechanism can only solve the performance problem of edge users and have certain requirements on the mobility of the terminal, and therefore is not applicable to scenes where the terminal moves at high speed.

Therefore, how to reduce the interference with communication between the terminal and the eNodeB of a small cell while ensuring the communication effect when the terminal moves at high speed within the small cell eNodeB has become an urgent technical problem to be solved.

SUMMARY

Based on at least one of the above-mentioned technical problems, the present disclosure provides a new eNodeB-based communication scheme, which can effectively avoid interference with communication between a terminal and an eNodeB, while increasing the throughput of the interaction between the terminal and the eNodeB and ensuring good communication when the terminal moves at a high speed in the eNodeB.

In view of this, the present disclosure provides an eNodeB-based communication method, which includes: a plurality of eNodeBs are divided into at least one eNodeB cluster; when a terminal moves within any eNodeB cluster of the at least one eNodeB cluster, identification information of the any eNodeB cluster is obtained and an eNodeB associated with the terminal is determined from among the any eNodeB cluster through the terminal; the eNodeB associated with the terminal is scheduled to provide communication service for the terminal.

In this technical scheme, the eNodeB associated with the terminal is determined from among an eNodeB cluster, such that when the communication between the eNodeB in which the terminal is currently located and the terminal is interfered by other communication, other eNodeBs in the eNodeB cluster can be scheduled to carry out data interaction with the terminal, and therefore, interference between the terminal and the eNodeB can be avoided. And at the same time, since the terminal can be served through a plurality of eNodeBs, it is possible to improve the throughput of the interaction between the terminal and the eNodeB, and ensure the communication effect when the terminal moves at high speed within the eNodeB, thus enhancing the user experience.

For example, in an eNodeB cluster, it is determined that eNodeBs associated with the terminal are eNodeB A, eNodeB B, and eNodeB C. Suppose the eNodeB currently communicating with the terminal is eNodeB A; however, it is found that the communication interference between eNodeB A and the terminal is large, and the communication interference between eNodeB B and/or eNodeB C and the terminal is small, then eNodeB B and/or eNodeB C can be scheduled to provide services for the terminal, so as to avoid the problem that the communication quality is poor due to the terminal continuing to communicate with eNodeB A. In addition, if eNodeB A currently communicating with the terminal has a large load, eNodeB B and/or eNodeB C can be scheduled to provide services for the terminal, so as to reduce the load pressure of eNodeB A. At the same time, in order to ensure higher communication efficiency and throughput between the terminal and the eNodeB, eNodeB A, eNodeB B, and eNodeB C can be scheduled to provide services for the terminal simultaneously.

In the above-mentioned technical scheme, as an implementation, the eNodeB associated with the terminal is scheduled to provide communication services for the terminal by a specified eNodeB of the any eNodeB cluster.

Specifically, each eNodeB cluster can have a cluster head, which can establish a connection with a communication eNodeB and perform scheduling operations on other eNodeBs in the entire eNodeB cluster.

In the above-mentioned technical scheme, as an implementation, the method can further include: the identification information of the any eNodeB cluster is transmitted in the same or different time-frequency resources by part or all of the eNodeBs in the any eNodeB cluster, whereby the terminal can determine the eNodeB cluster in which the terminal is located.

In the above-mentioned technical scheme, as an implementation, identification information corresponding to each eNodeB in the any eNodeB cluster is transmitted to the terminal through the communication eNodeB or the specified eNodeB.

In this technical scheme, by transmitting the identification information of an eNodeB and the corresponding identification information, the terminal can determine each eNodeB in the eNodeB cluster by measuring the identification information. After determining the associated eNodeB, the terminal can upload the identification information of a corresponding eNodeB to the cluster head performing scheduling operations, whereby the cluster head can schedule the corresponding eNodeB.

In the above-mentioned technical scheme, as an implementation, the identification information corresponding to each eNodeB includes CSI-RS (Channel State Information-Reference Signal) information.

In the above-mentioned technical scheme, as an implementation, the process that the eNodeB associated with the terminal is determined from among the any eNodeB cluster by the terminal includes: the CSI-RS information that is able to be received by the terminal at the current location is measured through the terminal; according to the CSI-RS information corresponding to each eNodeB, an eNodeB corresponding to the CSI-RS information that is able to be received by the terminal at the current location is determined, so as to determine the eNodeB associated with the terminal.

In the above mentioned technical scheme, the specified eNodeB notifies the terminal to measure the CSI-RS information at a specified time-frequency location through a radio resource control signaling, a medium access control unit signaling, or a physical layer signaling.

In the above-mentioned technical scheme, as an implementation, the manner in which the eNodeB associated with the terminal is scheduled to provide communication services for the terminal includes: the eNodeB associated with the terminal is scheduled for joint transmission; the eNodeB that provides communication services to the terminal is selected dynamically, or the eNodeB associated with the terminal is scheduled to send transmission signals in coordination.

In this technical scheme, after the eNodeB associated with the terminal is determined, the terminal can be served in a combined transmission manner, so as to ensure the communication quality of the terminal and improve system throughput; in order to avoid interference to the communication of the terminal, the eNodeB that provides communication services for the terminal can be selected dynamically, or the eNodeB associated with the terminal can be scheduled to send transmission signals in coordination; in this way, under the prerequisite of ensuring communication continuity between the terminal and the eNodeB, the transmission efficiency of the communication process can be improved, the interference of communication can be effectively reduced, and the user experience can be enhanced.

In the above-mentioned technical scheme, as an implementation, the specified eNodeB can establish a connection with the communication eNodeB.

In this technical scheme, the specified eNodeB (that is, the cluster head) can establish a connection with the communication eNodeB, such that even if the terminal is out of coverage of the cluster head, it can also interact with the cluster head through the communication eNodeB, thereby ensuring that the cluster head can schedule the corresponding eNodeB to provide services for the terminal according to the eNodeB reported by the terminal.

In the above-mentioned technical scheme, as an implementation, the specified eNodeB can establish the connection with the communication eNodeB via a wired interface or a wireless interface.

According to a second aspect of the present disclosure, it is provided an eNodeB-based communication system, which includes: a dividing unit, configured to divide a plurality of eNodeBs into at least one eNodeB cluster; a determining unit, configured to obtain identification information of the any eNodeB cluster when a terminal moves within any eNodeB cluster of the at least one eNodeB cluster, and determine from among the any eNodeB cluster an eNodeB associated with the terminal through the terminal; a scheduling unit, configured to schedule the eNodeB associated with the terminal to provide communication service for the terminal.

In this technical scheme, the eNodeB associated with the terminal is determined from among an eNodeB cluster, such that when the communication between the eNodeB in which the terminal is currently located and the terminal is interfered by other communication, other eNodeBs in the eNodeB cluster can be scheduled to carry out data interaction with the terminal, and therefore, interference between the terminal and the eNodeB can be avoided. And at the same time, since the terminal can be served through a plurality of eNodeBs, it is possible to improve the throughput of the interaction between the terminal and the eNodeB, and ensure the communication effect when the terminal moves at high speed within the eNodeB, thus enhancing the user experience.

For example, in an eNodeB cluster, it is determined that eNodeBs associated with the terminal are eNodeB A, eNodeB B, and eNodeB C. Suppose the eNodeB currently communicating with the terminal is eNodeB A; however, it is found that the communication interference between eNodeB A and the terminal is large, and the communication interference between eNodeB B and/or eNodeB C and the terminal is small, then eNodeB B and/or eNodeB C can be scheduled to provide services for the terminal, so as to avoid the problem that the communication quality is poor due to the terminal continuing to communicate with eNodeB A. In addition, if eNodeB A currently communicating with the terminal has a large load, eNodeB B and/or eNodeB C can be scheduled to provide services for the terminal, so as to reduce the load pressure of eNodeB A. At the same time, in order to ensure higher communication efficiency and throughput between the terminal and the eNodeB, eNodeB A, eNodeB B, and eNodeB C can be scheduled to provide services for the terminal simultaneously.

In the above-mentioned technical scheme, as an implementation, the scheduling unit is configured to: schedule the eNodeB associated with the terminal to provide communication services for the terminal by a specified eNodeB of the any eNodeB cluster.

Specifically, each eNodeB cluster can have a cluster head, which can establish a connection with a communication eNodeB and perform scheduling operations on other eNodeBs in the entire eNodeB cluster.

In the above-mentioned technical scheme, as an implementation, the system can further include: a transmitting unit, configured to transmit identification information of the any eNodeB cluster in the same or different time-frequency resources through part or all of the eNodeBs in the any eNodeB cluster, whereby the terminal can determine the eNodeB cluster in which the terminal is located.

In the above-mentioned technical scheme, as an implementation, identification information corresponding to each eNodeB in the any eNodeB cluster is transmitted to the terminal through the communication eNodeB or the specified eNodeB.

In this technical scheme, by transmitting the identification information of an eNodeB and the corresponding identification information, the terminal can determine each eNodeB in the eNodeB cluster by measuring the identification information. After determining the associated eNodeB, the terminal can upload the identification information of a corresponding eNodeB to the cluster head performing scheduling operations, whereby the cluster head can schedule the corresponding eNodeB.

In the above-mentioned technical scheme, as an implementation, the identification information corresponding to each eNodeB includes CSI-RS information.

In the above mentioned technical scheme, as an implementation, the transmitting unit is further configured to: transmit the identification information of the any eNodeB and the CSI-RS information corresponding to each eNodeB in the any eNodeB to the terminal by the communication eNodeB or the specified eNodeB.

In the above mentioned technical scheme, as an implementation, the determining unit is further configured to: measure the CSI-RS information that is able to be received by the terminal at the current location through the terminal; according to the CSI-RS information corresponding to each eNodeB, determine an eNodeB corresponding to the CSI-RS information that is able to be received by the terminal at the current location, so as to determine the eNodeB associated with the terminal.

In the above mentioned technical scheme, the specified eNodeB notifies the terminal to measure the CSI-RS information at a specified time-frequency location through a radio resource control signaling, a medium access control unit signaling, or a physical layer signaling.

In the above mentioned technical scheme, the scheduling unit is configured to: schedule the eNodeB associated with the terminal for joint transmission; select the eNodeB that provides communication services to the terminal dynamically, or schedule the eNodeB associated with the terminal to send transmission signals in coordination.

In this technical scheme, after the eNodeB associated with the terminal is determined, the terminal can be served in a combined transmission manner, so as to ensure the communication quality of the terminal and improve system throughput; in order to avoid interference to the communication of the terminal, the eNodeB that provides communication services for the terminal can be selected dynamically, or the eNodeB associated with the terminal can be scheduled to send transmission signals in coordination; in this way, under the prerequisite of ensuring communication continuity between the terminal and the eNodeB, the transmission efficiency of the communication process can be improved, the interference of communication can be effectively reduced, and the user experience can be enhanced.

In the above-mentioned technical scheme, as an implementation, the specified eNodeB can establish a connection with the communication eNodeB.

In this technical scheme, the specified eNodeB (that is, the cluster head) can establish a connection with the communication eNodeB, such that even if the terminal is out of coverage of the cluster head, it can also interact with the cluster head through the communication eNodeB, thereby ensuring that the cluster head can schedule the corresponding eNodeB to provide services for the terminal according to the eNodeB reported by the terminal. For example, the specified eNodeB can establish the connection with the communication eNodeB via a wired interface or a wireless interface.

In the above-mentioned technical scheme, as an implementation, the specified eNodeB can establish the connection with the communication eNodeB via a wired interface or a wireless interface.

Through the above-mentioned technical scheme, it is possible to effectively avoid the problem of interference between the terminal and the eNodeB, improve the throughput of the interaction between the terminal and the eNodeB, and ensure the communication effect when the terminal moves at high speed within the eNodeB.

DETAILED DESCRIPTION

In order to illustrate the technical solutions of the present disclosure or the related art more clearly, a brief description of the accompanying drawings used herein is given below. Obviously, the drawings listed below are only examples, and a person skilled in the art should be noted that, other drawings can also be obtained on the basis of these exemplary drawings without creative work.

In the following description, numerous specific details are set forth in order to facilitate a thorough understanding of the present disclosure, however, the present disclosure can be practiced otherwise than as specifically described herein, and therefore, the scope of the present disclosure is not to be limited by the specific implementations disclosed below.

It should be noted that, in the specification, "eNodeB" (Evolved Node B) referred to herein refers to an eNodeB applied to the scene of a small-cell(s), that is, an eNodeB of a small cell or an eNodeB corresponding to a small cell, and in the following, for ease of illustration, the eNodeB used for the implementation of the present disclosure can be referred to as "small-cell eNodeB", however, this should not be construed as imposing any limitation on the present disclosure. An eNodeB cluster can be understood as a small cell cluster in which the small cell corresponding to the eNodeB, and similarly, dividing eNodeBs into at least one cluster can be understood as dividing small cells corresponding to eNodeBs into at least one cluster.

It should also be noted that, in implementations of the present disclosure, "eNodeB" of LTE (Long Term Evolution) system is used as an example for explanation, however, the present disclosure is not limited thereto, for example, Node B (that is, base station) or other wireless access apparatus of other network standards such as 3G and so on can also be used to implement the technical schemes of the present disclosure.

Figure 1:
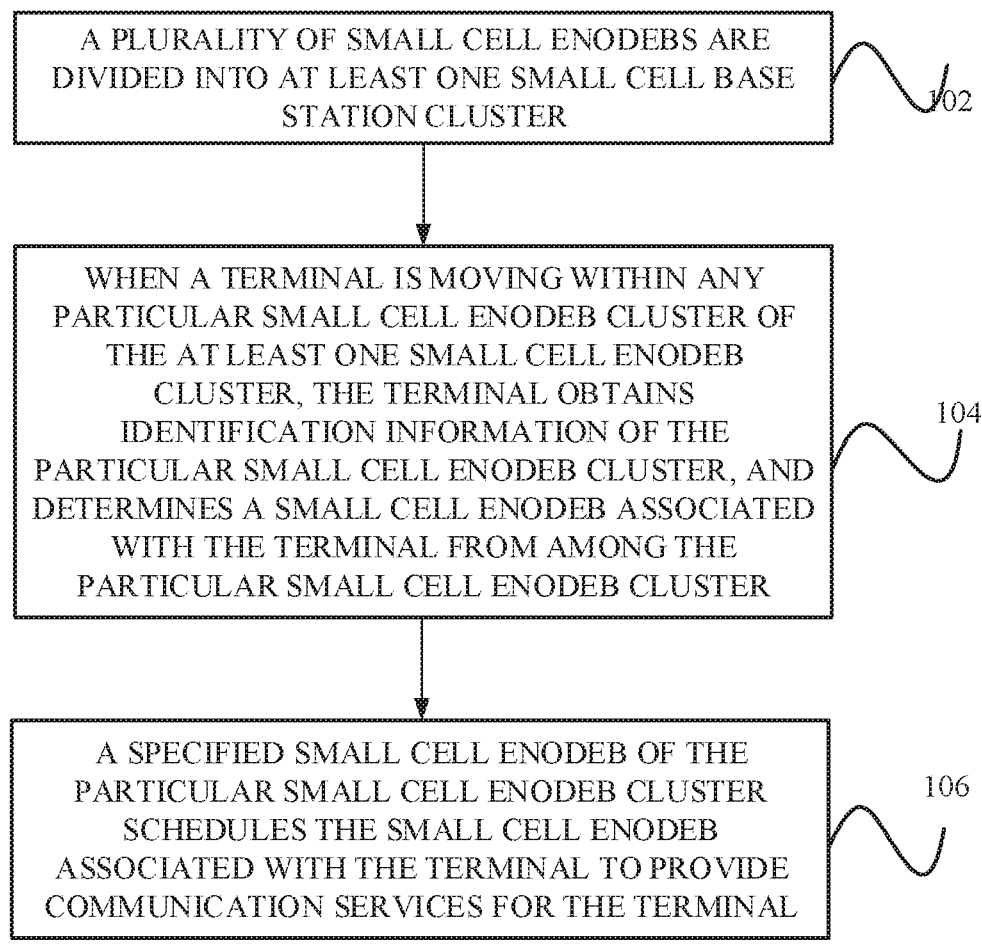
FIG. 1 is a schematic flow chart illustrating an eNodeB-based communication method according to an implementation of the present disclosure.

FIG. 1 is a schematic flow chart illustrating a small cell eNodeB-based communication method according to an implementation of the present disclosure, for example, the communication method can be performed by equipment provided in a small cell eNodeB or equipment provided in other devices which can communicate with a small cell eNodeB.

As shown in FIG. 1, the small cell eNodeB-based communication method according to an implementation of the present disclosure includes: S102, a plurality of small cell eNodeBs are divided into at least one small cell eNodeB cluster; S104, when a terminal moves within any small cell eNodeB cluster of the at least one small cell eNodeB cluster, identification information of the any small cell eNodeB cluster is obtained and a small cell eNodeB associated with the terminal is determined from among the any small cell eNodeB cluster through the terminal; and S106, the small cell eNodeB associated with the terminal is scheduled to provide communication service for the terminal.

In this technical scheme, the small cell eNodeB associated with the terminal is determined from among a small cell eNodeB cluster, such that when the communication between the small cell eNodeB in which the terminal is currently located and the terminal is interfered by other communication, other small cell eNodeBs in the small cell eNodeB cluster can be scheduled to carry out data interaction with the terminal, and therefore, interference between the terminal and the small cell eNodeB can be avoided. And at the same time, since the terminal can be served through a plurality of small cell eNodeBs, it is possible to improve the throughput of the interaction between the terminal and the eNodeB, and ensure the communication effect when the terminal moves at high speed within the small cell eNodeB, thus enhancing the user experience.

For example, in a small cell eNodeB cluster, it is determined that small cell eNodeBs associated with the terminal are small cell eNodeB A, small cell eNodeB B, and small cell eNodeB C. Suppose the small cell eNodeB currently communicating with the terminal is small cell eNodeB A; however, it is found that the communication interference between small cell eNodeB A and the terminal is large, and the communication interference between small cell eNodeB B and/or small cell eNodeB C and the terminal is small, then small cell eNodeB B and/or small cell eNodeB C can be scheduled to provide services for the terminal, so as to avoid the problem that the communication quality is poor due to the terminal continuing to communicate with small cell eNodeB A. In addition, if small cell eNodeB A currently communicating with the terminal has a large load, small cell eNodeB B and/or small cell eNodeB C can be scheduled to provide services for the terminal, so as to reduce the load pressure of small cell eNodeB A. At the same time, in order to ensure higher communication efficiency and throughput between the terminal and the small cell eNodeB, small cell eNodeB A, small cell eNodeB B, and small cell eNodeB C can be scheduled to provide services for the terminal simultaneously.

In the above-mentioned technical scheme, as an implementation, the small cell eNodeB associated with the terminal is scheduled to provide communication services for the terminal by a specified small cell eNodeB of the any small cell eNodeB cluster.

Specifically, each small cell eNodeB cluster can have a cluster head, which can establish a connection with a communication eNodeB and perform scheduling operations on other small cell eNodeBs in the entire small cell eNodeB cluster.

In the above-mentioned technical scheme, as an implementation, the method can further include: identification information of the any small cell eNodeB cluster is transmitted in the same or different time-frequency resources by part or all of the small cell eNodeBs in the any small cell eNodeB cluster, whereby the terminal can determine the small cell eNodeB cluster in which the terminal is located.

In the above-mentioned technical scheme, as an implementation, identification information corresponding to each small cell eNodeB in the any small cell eNodeB cluster is transmitted to the terminal through the communication eNodeB or the specified small cell eNodeB.

In this technical scheme, by transmitting the identification information of a small cell eNodeB and the corresponding identification information, the terminal can determine each small cell eNodeB in the small cell eNodeB cluster by measuring the identification information. After determining the associated small cell eNodeB, the terminal can upload the identification information of a corresponding small cell eNodeB to the cluster head performing scheduling operations, whereby the cluster head can schedule the corresponding small cell eNodeB.

In the above-mentioned technical scheme, as an implementation, the identification information corresponding to each small cell eNodeB includes CSI-RS (Channel State Information-Reference Signal) information.

In the above-mentioned technical scheme, as an implementation, the process that the small cell eNodeB associated with the terminal is determined from among the any small cell eNodeB cluster by the terminal includes: the CSI-RS information that is able to be received by the terminal at the current location is measured by the terminal; according to the CSI-RS information corresponding to each small cell eNodeB, a small cell eNodeB corresponding to the CSI-RS information that is able to be received by the terminal at the current location is determined, so as to determine the small cell eNodeB associated with the terminal.

In the above mentioned technical scheme, the specified small cell eNodeB notifies the terminal to measure the CSI-RS information at a specified time-frequency location through a radio resource control signaling, a medium access control unit signaling, or a physical layer signaling.

In the above-mentioned technical scheme, as an implementation, the manner in which the small cell eNodeB associated with the terminal is scheduled to provide communication services for the terminal includes: the small cell eNodeB associated with the terminal is scheduled for joint transmission; the small cell eNodeB that provides communication services to the terminal is selected dynamically, or the small cell eNodeB associated with the terminal is scheduled to send transmission signals in coordination.

In this technical scheme, after the small cell eNodeB associated with the terminal is determined, the terminal can be served in a combined transmission manner, so as to ensure the communication quality of the terminal and improve system throughput; in order to avoid interference to the communication of the terminal, the small cell eNodeB that provides communication services for the terminal can be selected dynamically, or the small cell eNodeB associated with the terminal can be scheduled to send transmission signals in coordination; in this way, under the prerequisite of ensuring communication continuity between the terminal and the small cell eNodeB, the transmission efficiency of the communication process can be improved, the interference of communication can be effectively reduced, and the user experience can be enhanced.

In the above-mentioned technical scheme, as an implementation, the specified small cell eNodeB can establish a connection with the communication eNodeB.

In this technical scheme, the specified small cell eNodeB (that is, the cluster head) can establish a connection with the communication eNodeB, such that even if the terminal is out of coverage of the cluster head, it can also interact with the cluster head through the communication eNodeB, thereby ensuring that the cluster head can schedule the corresponding small cell eNodeB to provide services for the terminal according to the small cell eNodeB reported by the terminal.

In the above-mentioned technical scheme, as an implementation, the specified small cell eNodeB can establish the connection with the communication eNodeB via a wired interface or a wireless interface.

Figure 2:
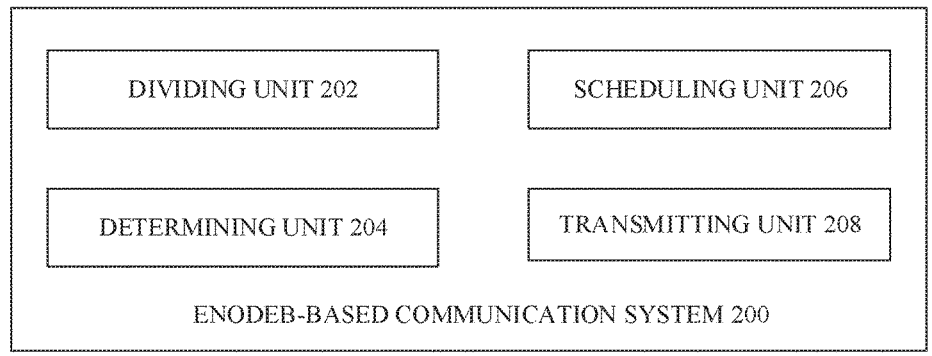
FIG. 2 is a schematic block diagram illustrating an eNodeB-based communication system according to an implementation of the present disclosure.

FIG. 2 is a schematic block diagram illustrating a small cell eNodeB-based communication system according to an implementation of the present disclosure, for example, the communication system can be located in a small cell eNodeB or other equipment.

As illustrated in FIG. 2, a small cell eNodeB-based communication system 200 according to the implementation of the present disclosure includes: a dividing unit 202, configured to divide a plurality of small cell eNodeBs into at least one small cell eNodeB cluster; a determining unit 204, configured to obtain identification information of the any small cell eNodeB cluster when a terminal moves within any small cell eNodeB cluster of the at least one small cell eNodeB cluster, and determine from among the any small cell eNodeB cluster a small cell eNodeB associated with the terminal through the terminal; a scheduling unit 206, configured to schedule the small cell eNodeB associated with the terminal to provide communication service for the terminal.

In this technical scheme, the small cell eNodeB associated with the terminal is determined from among a small cell eNodeB cluster, such that when the communication between the small cell eNodeB in which the terminal is currently located and the terminal is interfered by other communication, other small cell eNodeBs in the small cell eNodeB cluster can be scheduled to carry out data interaction with the terminal, and therefore, interference between the terminal and the small cell eNodeB can be avoided. And at the same time, since the terminal can be served through a plurality of small cell eNodeBs, it is possible to improve the throughput of the interaction between the terminal and the eNodeB, and ensure the communication effect when the terminal moves at high speed within the small cell eNodeB, thus enhancing the user experience.

For example, in a small cell eNodeB cluster, it is determined that small cell eNodeBs associated with the terminal are small cell eNodeB A, small cell eNodeB B, and small cell eNodeB C. Suppose the small cell eNodeB currently communicating with the terminal is small cell eNodeB A; however, it is found that the communication interference between small cell eNodeB A and the terminal is large, and the communication interference between small cell eNodeB B and/or small cell eNodeB C and the terminal is small, then small cell eNodeB B and/or small cell eNodeB C can be scheduled to provide services for the terminal, so as to avoid the problem that the communication quality is poor due to the terminal continuing to communicate with small cell eNodeB A. In addition, if small cell eNodeB A currently communicating with the terminal has a large load, small cell eNodeB B and/or small cell eNodeB C can be scheduled to provide services for the terminal, so as to reduce the load pressure of small cell eNodeB A. At the same time, in order to ensure higher communication efficiency and throughput between the terminal and the small cell eNodeB, small cell eNodeB A, small cell eNodeB B, and small cell eNodeB C can be scheduled to provide services for the terminal simultaneously.

In the above-mentioned technical scheme, as an implementation, the scheduling unit is configured to: schedule the small cell eNodeB associated with the terminal to provide communication services for the terminal by a specified small cell eNodeB of the any small cell eNodeB cluster.

Specifically, each small cell eNodeB cluster can have a cluster head, which can establish a connection with a communication eNodeB and perform scheduling operations on other small cell eNodeBs in the entire small cell eNodeB cluster.

In the above-mentioned technical scheme, as an implementation, the system can further include: a transmitting unit 208, configured to transmit identification information of the any small cell eNodeB cluster in the same or different time-frequency resources through part or all of the small cell eNodeBs in the any small cell eNodeB cluster, whereby the terminal can determine the small cell eNodeB cluster in which the terminal is located.

In the above-mentioned technical scheme, as an implementation, the transmitting unit 208 is further configured to transmit the identification information corresponding to each small cell eNodeB in the any small cell eNodeB cluster to the terminal through the communication eNodeB or the specified small cell eNodeB.

In this technical scheme, by transmitting the identification information of a small cell eNodeB and the corresponding identification information, the terminal can determine each small cell eNodeB in the small cell eNodeB cluster by measuring the identification information. After determining the associated small cell eNodeB, the terminal can upload the identification information of a corresponding small cell eNodeB to the cluster head performing scheduling operations, whereby the cluster head can schedule the corresponding small cell eNodeB.

In the above-mentioned technical scheme, as an implementation, the identification information corresponding to each small cell eNodeB includes CSI-RS information.

In the above mentioned technical scheme, as an implementation, the transmitting unit 208 is further configured to: transmit the identification information of the any small cell eNodeB and the CSI-RS information corresponding to each small cell eNodeB in the any small cell eNodeB to the terminal by the communication eNodeB or the specified small cell eNodeB.

In the above mentioned technical scheme, as an implementation, the determining unit 204 is further configured to: measure the CSI-RS information that is able to be received by the terminal at the current location through the terminal; according to the CSI-RS information corresponding to each small cell eNodeB, determine a small cell eNodeB corresponding to the CSI-RS information that is able to be received by the terminal at the current location, so as to determine the small cell eNodeB associated with the terminal.

In the above mentioned technical scheme, the specified small cell eNodeB notifies the terminal to measure the CSI-RS information at a specified time-frequency location through a radio resource control signaling, a medium access control unit signaling, or a physical layer signaling.

In the above mentioned technical scheme, the scheduling unit 206 is configured to: schedule the small cell eNodeB associated with the terminal for joint transmission; select the small cell eNodeB that provides communication services to the terminal dynamically, or schedule the small cell eNodeB associated with the terminal to send transmission signals in coordination.

In this technical scheme, after the small cell eNodeB associated with the terminal is determined, the terminal can be served in a combined transmission manner, so as to ensure the communication quality of the terminal and improve system throughput; in order to avoid interference to the communication of the terminal, the small cell eNodeB that provides communication services for the terminal can be selected dynamically, or the small cell eNodeB associated with the terminal can be scheduled to send transmission signals in coordination; in this way, under the prerequisite of ensuring communication continuity between the terminal and the small cell eNodeB, the transmission efficiency of the communication process can be improved, the interference of communication can be effectively reduced, and the user experience can be enhanced.

In the above-mentioned technical scheme, as an implementation, the specified small cell eNodeB can establish a connection with the communication eNodeB.

In this technical scheme, the specified small cell eNodeB (that is, the cluster head) can establish a connection with the communication eNodeB, such that even if the terminal is out of coverage of the cluster head, it can also interact with the cluster head through the communication eNodeB, thereby ensuring that the cluster head can schedule the corresponding small cell eNodeB to provide services for the terminal according to the small cell eNodeB reported by the terminal. For example, the specified small cell eNodeB can establish the connection with the communication eNodeB via a wired interface or a wireless interface.

In the above-mentioned technical scheme, as an implementation, the specified small cell eNodeB can establish the connection with the communication eNodeB via a wired interface or a wireless interface.

Technical schemes of the present disclosure will now be described in detail with reference to FIG. 3 and FIG. 4.

Figure 3:
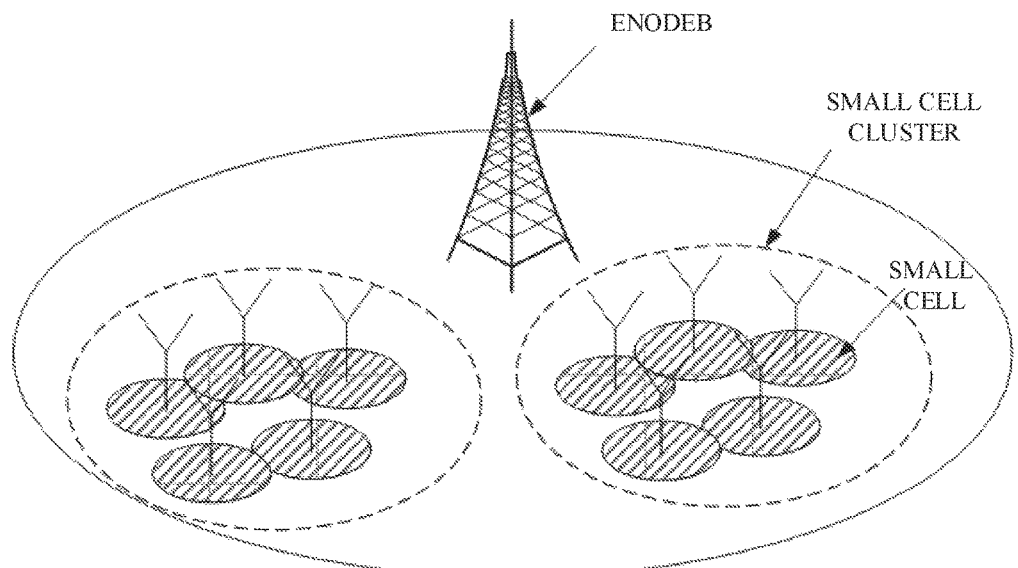
FIG. 3 is a structural diagram illustrating an eNodeB-based communication system according to an implementation of the present disclosure.
Figure 4:
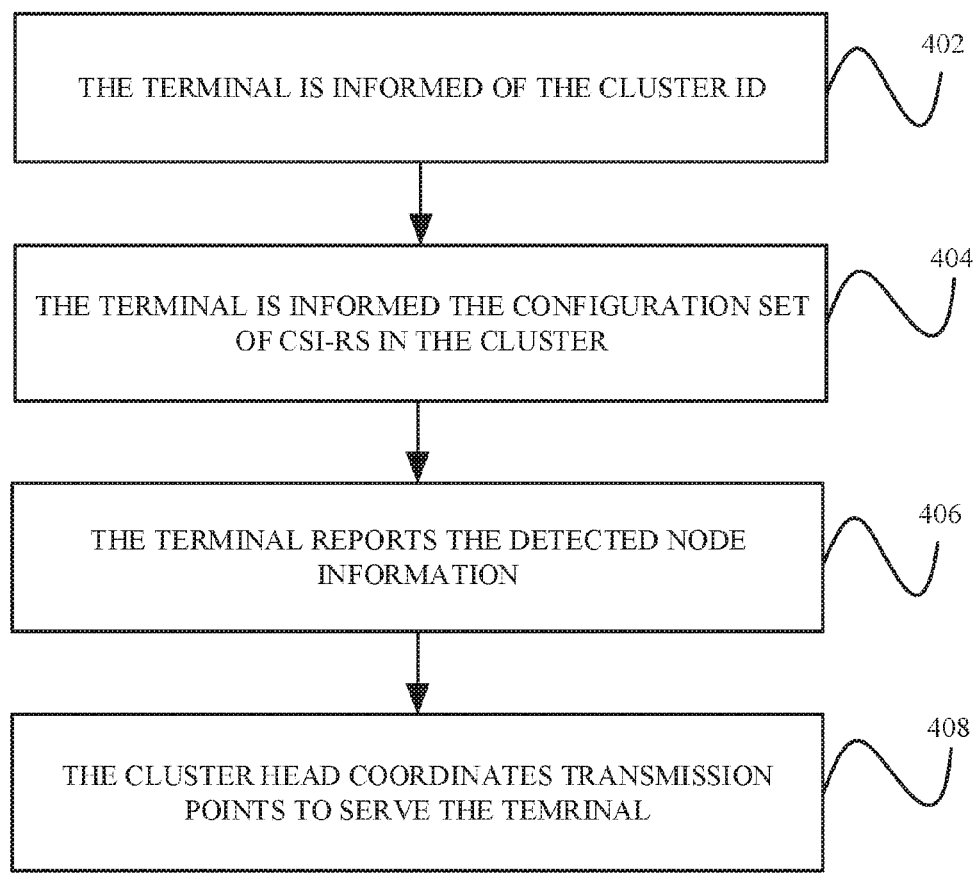
FIG. 4 is a schematic flow chart illustrating an eNodeB-based communication method according to another implementation of the present disclosure.

In order to better illustrate the technical scheme of the present disclosure, as shown in FIG. 3, the scenario given first is as follows:

(1) The terminal always has a cell connection to ensure mobility.

(2) Adjacent small cells form a small cell cluster, and the mechanism of clustering may be based on geographic location, mutual interference status, and the like. In one small cell cluster, there is a small cell as a cluster head, which is used for cluster coordination and can be connected with other small cells through an ideal backhaul. The cluster head can be connected to a MeNB or a small cell gateway through an optical fiber, copper or other wire interface or through a wireless interface. If the terminal is located in a small cell cluster, then all or part of nodes (that is, small cells other than the cluster head in the cluster) in the small cell cluster can carry out data communication with the terminal in a collaborative manner, and the communication process is illustrated in FIG. 4.

S402, the terminal obtains the cluster ID.

All nodes in a small cell cluster can have the same physical layer cell ID (that is, cluster ID), and the cell ID is transmitted to the terminal through a MeNB or the terminal can obtain the cell ID by searching. In order to enable the terminal to obtain the physical layer cell ID of the cluster by searching, in a cluster, all nodes can transmit PSS (Primary Synchronization Signal)/SSS (Secondary Synchronization Signal) at the same or different time-frequency resources, or, only some of the nodes (for example, the cluster head node) can transmit PSS/SSS at the same or different time-frequency resources.

S404, the terminal obtains a configuration set of the CSI-RS in the cluster.

Specifically, if it is required to distinguish between different nodes in a cluster, then it is necessary to inform the terminal of a configuration set of the CSI-RS, which can be achieved in two ways. One approach is to inform the terminal through a MeNB, specifically, the MeNB can inform the terminal of a correspondence relationship between a physical layer cell-ID and a CSI-RS configuration set, and when the terminal enters into a small cell cluster, it can know the configuration set of the CSI-RS of the small cell cluster with aid of the detected physical layer cell ID and the correspondence relationship informed by the MeNB. Another approach is to inform the terminal of the configuration set of the CSI-RS of a cluster by the cluster head of the cluster, and when the terminal enters into a small cell cluster and detects the physical layer cell ID, the cluster head can inform the terminal the configuration set of the CSI-RS of the cluster via RRC (Radio Resource Control) signaling, a MAC (Medium Access Control) CE (Control Element), or system information (such as physical layer signaling).

S406, the terminal reports the detected node information.

Specifically, when the terminal moves in the cluster, it can obtain information of transmission nodes around by measuring in accordance with the informed configuration set of CSI-RS and transmit a SR (Scheduling Request) on predefined resources, the detected information of the transmission nodes can be informed to the cluster head via a PUCCH (Physical Uplink Control Channel), a PUSCH (Physical Uplink Shared Channel), or a PRACH (Physical Random Access Channel). In this situation, the cluster head needs to inform the terminal of the time-frequency information to be measured in advance.

S408, the cluster head coordinates the transmission points to provide services for the terminal.

Specifically, when the cluster head obtains the information of the nodes around, it will inform, via backhaul signaling, corresponding nodes to serve the terminal. Specific service methods can be combined transmission, dynamic node selection, or coordinated transmission of transmission signals, etc. Corresponding nodes will provide the terminal with communication service jointly or independently according to the scheduling operations of the cluster head.

As the terminal moves, the cluster head can allocate different service nodes to the terminal in real time according to the node information detected by the terminal, so as to ensure the continuity of terminal communication.

Technical schemes of the present disclosure have been described in detail with reference to the accompanying drawings. Considering the problem in the related art that mobile communication of the terminal cannot be guaranteed while reducing interference among small cell eNodeBs, the new small cell eNodeB-based communication scheme is proposed in the present disclosure, through which the terminal can be cooperatively served in a small cell eNodeB cluster, interferences among small cell eNodeBs can be reduced, and communication effect when the terminal moves at a high speed in a small cell eNodeB can be ensured, therefore, the user experience can be enhanced.

According to another implementation of the present disclosure, it is provided an apparatus, which can include at least one processors and a memory configured to store program codes.

Figure 5:
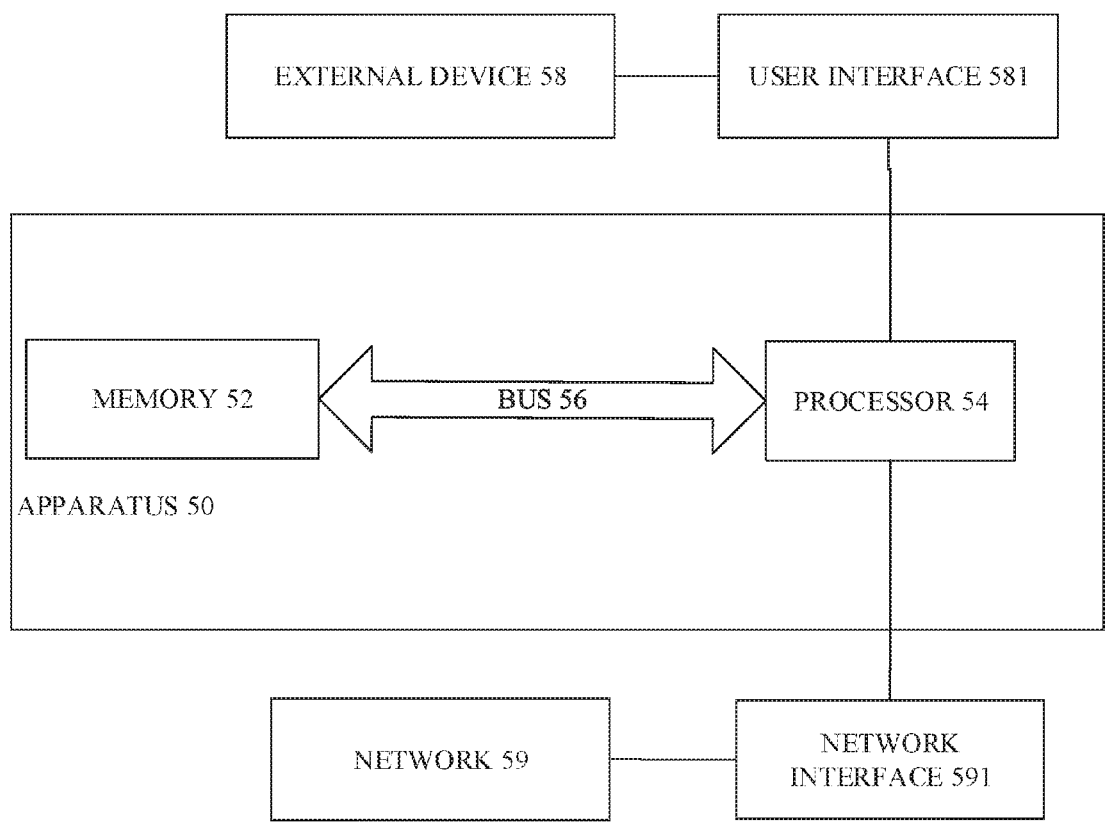
FIG. 5 is a block diagram illustrating an apparatus according to an implementation of the present disclosure.

As illustrated in FIG. 5, the apparatus 50 includes a memory 52 and at least one processor 54 (for clarity, only one is illustrated in the figure). The memory 52 and the processor 54 can be connected in a wired or wireless manner, for example, through a bus 56.

To be specific, the memory 52 is configured to store computer-readable program code, and can be ROM, RAM, CD-RAM, or any other removable storage medium; the processor 54 is configured to invoke the computer-readable program code stored in the memory 52 to execute predetermined process such as the methods according to the implementations of the present disclosure described above, to avoid unnecessarily obscuring the present disclosure, the details of the methods or process is not provided here. In addition, as illustrated in FIG. 5, the processor 54 can but not necessarily be connected to an external device 58 through a user interface 581 or to a network 59 through a network interface 591. Alternatively, the processor 54 can also be connected to the outside terminal or network in a wireless manner.

According to a further implementation of the disclosure, it is provided a computer-readable storage medium configured to store computer-readable program code, when executed on a data-processing apparatus, the program code is adapted to perform the methods as described in the above-mentioned implementations.

The computer-readable storage medium may be referred to as a non-volatile computer-readable storage medium or tangible computer-readable medium. Examples of computer-readable storage medium include but are not limited to: magnetic hard disk drive, solid state hard disk, flash memory, USB thumb drive, RAM, ROM, magneto-optical disk, and the register file of the processor.

The term computer readable-storage medium also refers to various types of recording media capable of being accessed by the computer device via a network or communication link. For example, data may be retrieved over a modem, over the internet, or over a local area network. References to a computer-readable storage medium should be interpreted as possibly being multiple computer-readable storage mediums. For example, the computer-readable storage medium can be multiple computer-readable storage medium within the same computer system, or, can be computer readable storage medium distributed among multiple computer systems or computing devices.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for eNodeB-based communication, comprising:
    dividing a plurality of eNodeBs into at least one eNodeB cluster;
    when a terminal moves within any eNodeB cluster of the at least one eNodeB cluster, obtaining identification information of the any eNodeB cluster and determining an eNodeB associated with the terminal from the any eNodeB cluster through the terminal;
    scheduling the eNodeB associated with the terminal to provide communication service for the terminal; and
    based on a determination that a communication interference between the eNodeB associated with the terminal and the terminal is above a threshold, scheduling another eNodeB of the any eNodeB cluster to provide communication service for the terminal.

2. The method of claim 1, wherein the eNodeB associated with the terminal is scheduled to provide communication services for the terminal by a specified eNodeB of the any eNodeB cluster.

3. The method of claim 2, further comprising:
    transmitting the identification information of the any eNodeB cluster in the same or different time-frequency resources by part or all of the eNodeBs in the any eNodeB cluster, wherein the terminal determines the any eNodeB cluster in which the terminal is located.

4. The method of claim 3, wherein identification information corresponding to each eNodeB in the any eNodeB cluster is transmitted to the terminal through the communication eNodeB or the specified eNodeB.

5. The method of claim 4, wherein the identification information corresponding to each eNodeB in the any eNodeB cluster comprises Channel State Information-Reference Signal (CSI-RS) information.

6. The method of claim 5, wherein determining the eNodeB associated with the terminal from the any eNodeB cluster through the terminal comprises:
    measuring the CSI-RS information that is able to be received by the terminal at a current location through the terminal; and
    according to the CSI-RS information corresponding to each eNodeB in the any eNodeB cluster, determining an eNodeB corresponding to the CSI-RS information that is able to be received by the terminal at the current location to determine the eNodeB associated with the terminal.

7. The method of claim 6, wherein the specified eNodeB notifies the terminal to measure the CSI-RS information at a specified time-frequency location through a radio resource control signaling or a physical layer signaling.

8. The method of claim 2, wherein scheduling the eNodeB associated with the terminal to provide communication service for the terminal comprises:
    scheduling the eNodeB associated with the terminal for joint transmission; and at least one of:
    dynamically selecting the eNodeB that provides communication services to the terminal; and
    scheduling the eNodeB associated with the terminal to send transmission signals in coordination.

9. The method of claim 2, wherein the specified eNodeB establishes a connection with the communication eNodeB.

10. The method of claim 9, wherein the specified eNodeB establishes the connection with the communication eNodeB via a wired interface or a wireless interface.

11. A system for eNodeB-based communication, comprising:
    a processor;
    a memory configured to store computer-readable program code that, when executed by the processor, cause the processor to:
        divide a plurality of eNodeBs into at least one eNodeB cluster;
        obtain identification information of any eNodeB cluster of the at least one eNodeB cluster when a terminal moves within the any eNodeB cluster of the at least one eNodeB cluster, and determine from the any eNodeB cluster an eNodeB associated with the terminal through the terminal;
        schedule the eNodeB associated with the terminal to provide communication service for the terminal;

based on a determination that a communication interference between the eNodeB associated with the terminal and the terminal is above a threshold, schedule another eNodeB of the any eNodeB cluster to provide communication service for the terminal.

12. The system of claim 11, wherein the memory is configured to store computer-readable program code that, when executed by the processor, further causes the processor to:
schedule the eNodeB associated with the terminal to provide communication services for the terminal through a specified eNodeB of the any eNodeB cluster.

13. The system of claim 12, wherein the memory is configured to store computer-readable program code that, when executed by the processor, further causes the processor to:
transmit the identification information of the any eNodeB cluster in the same or different time-frequency resources by part or all of the eNodeBs in the any eNodeB cluster, wherein the terminal determines the eNodeB cluster in which the terminal is located.

14. The system of claim 13, wherein the memory is configured to store computer-readable program code that, when executed by the processor, further causes the processor to:
transmit identification information corresponding to each eNodeB in the any eNodeB cluster to the terminal through the communication eNodeB or the specified eNodeB.

15. The system of claim 14, wherein the identification information corresponding to each eNodeB in the any eNodeB cluster comprises Channel State Information-Reference Signal (CSI-RS) information.

16. The system of claim 15, wherein the memory is configured to store computer-readable program code that, when executed by the processor, further causes the processor to:
measure the CSI-RS information that is able to be received by the terminal at a current location through the terminal; and
according to the CSI-RS information corresponding to each eNodeB in the any eNodeB cluster, determine an eNodeB corresponding to the CSI-RS information that is able to be received by the terminal at the current location to determine the eNodeB associated with the terminal.

17. The system of claim 16, wherein the specified eNodeB notifies the terminal to measure the CSI-RS information at a specified time-frequency location through a radio resource control signaling or a physical layer signaling.

18. The system of claim 12, wherein the memory is configured to store computer-readable program code that, when executed by the processor, further causes the processor to:
schedule the eNodeB associated with the terminal for joint transmission; and at least one of:
dynamically select the eNodeB that provides communication services to the terminal; and
schedule the eNodeB associated with the terminal to send transmission signals in coordination.

19. The system of claim 12, wherein the specified eNodeB establishes a connection with the communication eNodeB.

20. The system of claim 19, wherein the specified eNodeB establishes the connection with the communication eNodeB via a wired interface or a wireless interface.

* * * * *